United States Patent
Ewert et al.

(10) Patent No.: US 9,972,222 B2
(45) Date of Patent: May 15, 2018

(54) LABEL ROLL WITH A BLANK LEADER AND METHOD OF MANUFACTURING

(71) Applicant: ODDS, LLC, Charlotte, NC (US)

(72) Inventors: Brian Ewert, Charlotte, NC (US); John Roberts, Charlotte, NC (US)

(73) Assignee: ODDS, LLC, Charlotte, NC (US)

( * ) Notice: Subject to any disclaimer, the term of this patent is extended or adjusted under 35 U.S.C. 154(b) by 49 days.

(21) Appl. No.: 15/008,222

(22) Filed: Jan. 27, 2016

(65) Prior Publication Data

US 2016/0217714 A1   Jul. 28, 2016

Related U.S. Application Data

(60) Provisional application No. 62/108,736, filed on Jan. 28, 2015.

(51) Int. Cl.
  *B32B 38/10* (2006.01)
  *G09F 3/00* (2006.01)
  *G09F 3/10* (2006.01)
  *B32B 43/00* (2006.01)
  *B41J 3/00* (2006.01)
  *G09F 3/02* (2006.01)

(52) U.S. Cl.
  CPC .......... *G09F 3/0286* (2013.01); *B32B 43/006* (2013.01); *B41J 3/00* (2013.01); *G09F 3/10* (2013.01); *G09F 2003/0201* (2013.01); *G09F 2003/0202* (2013.01); *G09F 2003/023* (2013.01); *G09F 2003/0229* (2013.01); *Y10T 156/1132* (2015.01); *Y10T 156/1944* (2015.01)

(58) Field of Classification Search
  CPC ......... Y10T 156/1132; Y10T 156/1168; Y10T 156/1944; G09F 2003/0201; G09F 2003/0202; G09F 2003/0229; B32B 43/006; C09J 2205/302
  See application file for complete search history.

(56) References Cited

U.S. PATENT DOCUMENTS

| | | | | |
|---|---|---|---|---|
| 3,522,136 A | * | 7/1970 | McCormick | B31D 1/021 156/384 |
| 3,568,881 A | * | 3/1971 | Croney | G07B 3/02 221/13 |
| 3,611,929 A | * | 10/1971 | Schrotz | B65C 11/0247 101/362 |
| 3,616,088 A | * | 10/1971 | Weir | B65G 1/1378 156/361 |
| 5,489,360 A | * | 2/1996 | Shimizu | B65C 1/021 156/542 |
| 5,926,197 A | * | 7/1999 | Kessler | B41J 29/17 347/171 |

(Continued)

FOREIGN PATENT DOCUMENTS

EP  0790205 A2 * 8/1997 ............... G09F 3/10

*Primary Examiner* — Mark A Osele

(74) *Attorney, Agent, or Firm* — Tuggle Duggins P.A.; Blake Hurt

(57) ABSTRACT

A method of manufacturing a roll of adhesive labels. The method includes the step of providing a plurality of adhesive labels fixed to a backing sheet. A predetermined number of labels are removed from the backing sheet to thereby form a leading edge of the sheet that only includes the backing sheet and no labels. The leading edge includes no labels to thereby facilitate mounting the sheet of carrier material on a printing or applicator machine.

7 Claims, 6 Drawing Sheets

(56) References Cited

U.S. PATENT DOCUMENTS

| | | | | |
|---|---|---|---|---|
| 8,088,238 B2* | 1/2012 | Hafner | ................. | B65H 19/102 |
| | | | | 156/159 |
| 8,986,498 B2* | 3/2015 | Fefin | .................... | B65C 9/1865 |
| | | | | 156/715 |
| 2005/0126701 A1* | 6/2005 | Hodsdon | ............... | G09F 3/0286 |
| | | | | 156/289 |
| 2006/0251845 A1* | 11/2006 | Miles | .................... | G09F 3/0288 |
| | | | | 428/42.3 |
| 2007/0114109 A1* | 5/2007 | Berndtsson | ............... | B65C 9/42 |
| | | | | 198/471.1 |

* cited by examiner

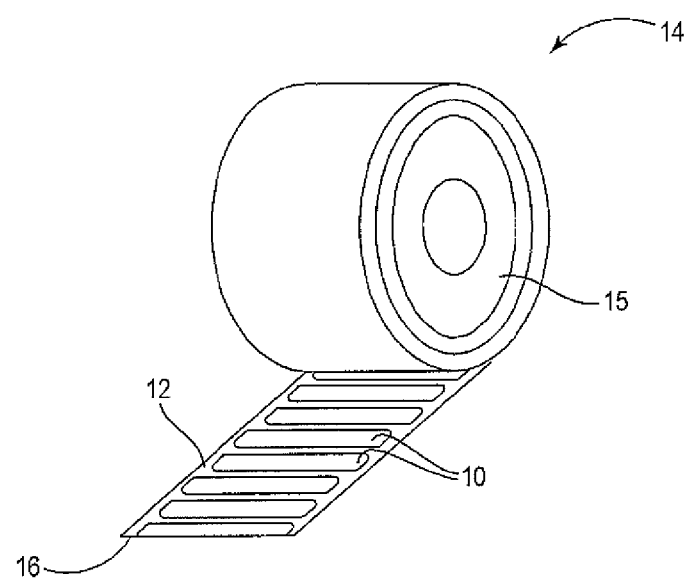
FIG. 1
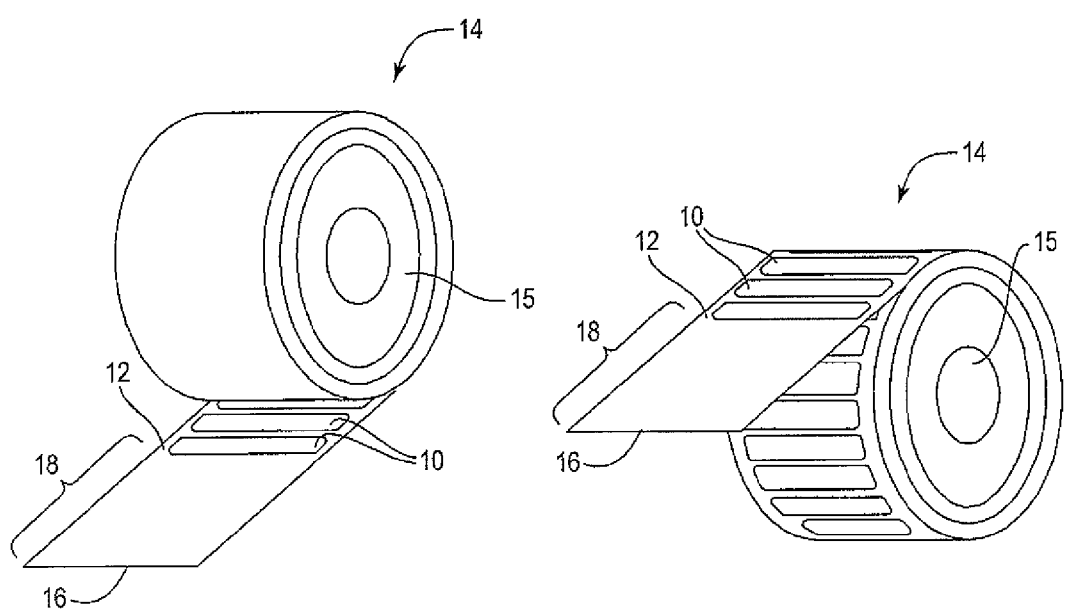
FIG. 2
FIG. 3

INACTIVE

ACTIVE

LABEL ROLL WITH A BLANK LEADER AND METHOD OF MANUFACTURING

CROSS REFERENCE TO RELATED APPLICATIONS

The present application claims priority to and the benefit of U.S. Provisional Patent Application No. 62/108,736, filed on Jan. 28, 2015. The foregoing provisional application is incorporated by reference herein in its entirety.

BACKGROUND

Rolls of labels are converted on high speed label presses. A master roll is loaded into the press and feed through a series of ink rollers, image rollers, dryers, die cutting rollers and slitter to a rewinder. The rewinder typically can be set to sense a number of labels on the web or footage of media it is winding, and when the target number of labels is reached the rewinder automatically cuts the web and starts the roll onto a new core. This creates a conventional roll of labels (FIG. 3) with labels from the start to the end of the liner on a roll. A typical manufacturer who uses labels, will have to remove 1 to 4 feet of labels from the roll, so that the labels can be threaded through a bar code printer or label applicator. Leaving the labels on the roll and feeding them through a machine can cause the labels to stick to components within the machines, such as rollers, guides, creating a mess that requires extra time to correct. Thus, most manufacturers have to take the time remove the labels manually and dispose of them, which can be a costly problem with conventionally rolled labels.

Some label suppliers will manually remove the labels, and charge an increased cost to the manufacturers for this service. The label supplier will use a crew of people to manually count and remove each label from the roll. For production runs of 100,000 or more labels, this becomes a substantial task.

BRIEF DESCRIPTION OF THE DRAWINGS

Features, aspects, and advantages of the present invention will become apparent from the following description and the accompanying exemplary embodiments shown in the drawings, which are briefly described below.

FIG. 1 is a perspective view of a roll of labels with the labels extending to the end of the roll.

FIG. 2 is a perspective view of a roll of inside wound labels with a number of labels removed automatically, according to an exemplary embodiment.

FIG. 3 is a perspective view of a roll of outside wound labels with a number of labels removed automatically, according to an exemplary embodiment.

DETAILED DESCRIPTION

Figure 4:
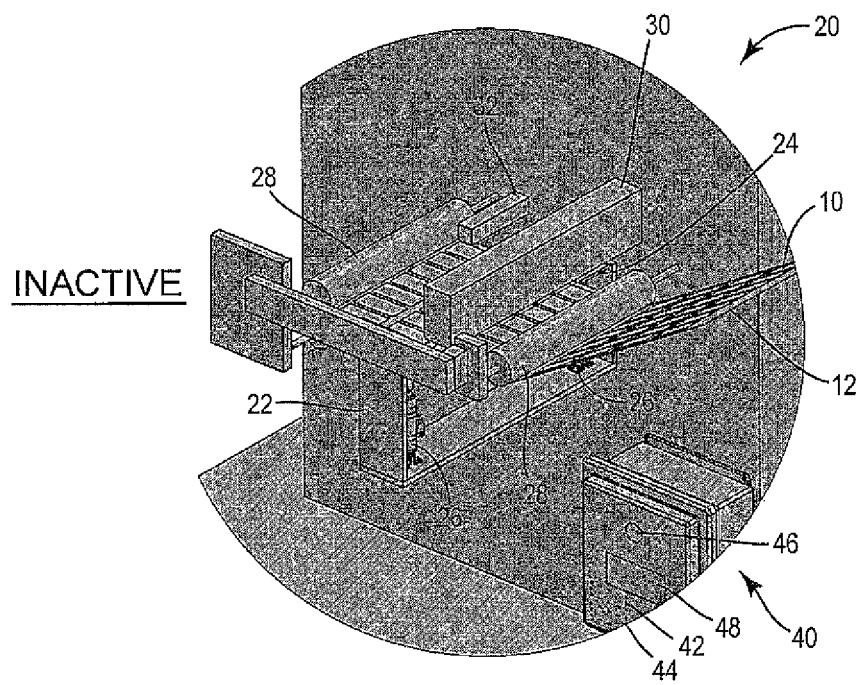
FIG. 4 is a perspective view of a label removal apparatus in an inactive state, according to an exemplary embodiment.
Figure 5:
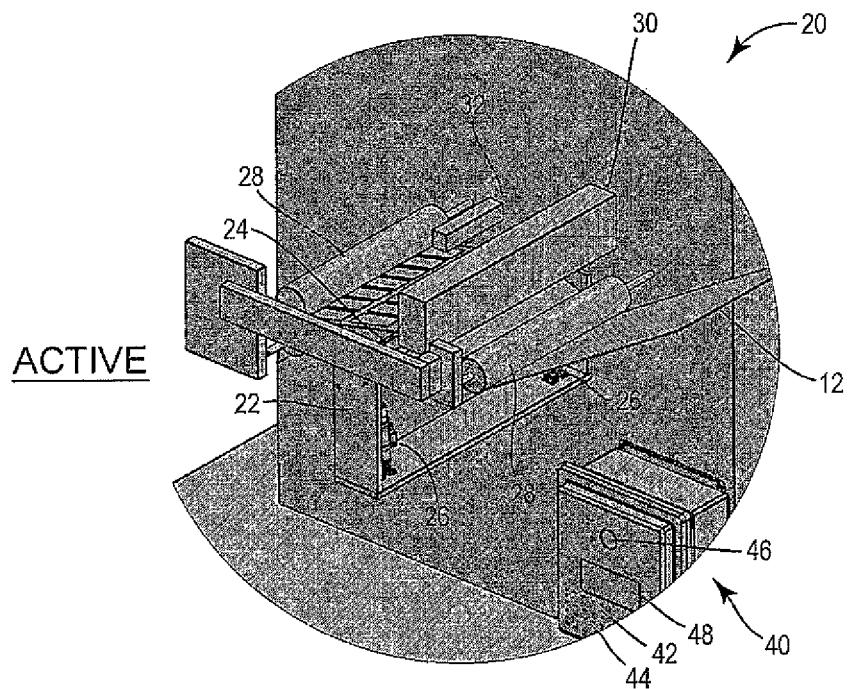
FIG. 5 is a perspective view of the label removal apparatus of FIG. 4, in an active state to remove labels from the label sheet.

It is to be understood that the following detailed description are exemplary and explanatory only, and are not restrictive of the invention.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

A label removal apparatus automatically removes labels from the backing web while the labels are being processed, such as in a conversion press. The web and remaining labels may be wound in another device to create a roll of labels with labels automatically removed to form a leader.

Referring to FIG. 1, labels 10 may be affixed to a web 12 (e.g., liner, backing sheet, etc.) and provided in a roll 14. The labels 10 are formed from a flexible material (e.g., film, paper, laminate) and include an adhesive applied to the back side of the labels 10. The web 12 may be coated with a material, such as silicone, that allows for the easy removal of the labels 10 from the web 12. The web 12 with the labels 10 may be provided in the form of a roll 14 wrapped around a core 15. The roll 14 be configured with the labels 10 affixed to the inside surface of the web 12 (FIGS. 1 and 2) (i.e., inside wound) or on the outside surface of the web 12 (FIG. 3) (i.e., outside wound). As shown in FIGS. 2 and 3, a number of labels 10 may be removed from the free end 16 of the roll 14 such that a length of the web 12 lacks labels 10 to form a leader 18. Such a roll 14 may be utilized, for example, in a mechanism where it is desirable to feed the leader 18 through the mechanism without the possibility of labels 10 becoming dislodged from the web 12 and disrupting the mechanism.

Referring to FIGS. 4-9, a label removal apparatus 20 is shown according to an exemplary embodiment. The label remover apparatus 20 is configured to automatically remove a number of labels 10 from the web 12 while the labels 10 are being processed to form the roll 14. In this way, the roll 14 may be produced with a number of labels 10 already removed from the end of the roll 14 to form a leader 18, negating the need for an end user or a manufacturer to manually remove the labels 10 to form the leader 18. The label removal apparatus 20 includes a frame 22, a plate 24 that is moveable relative to the frame 22, an actuator 26 configured to move the plate 24 between a first position and a second position, one or more rollers 28, a removal device, a sensor device 32, and a controller 40 configured to control the actuator 26 and the removal device.

Figure 6:
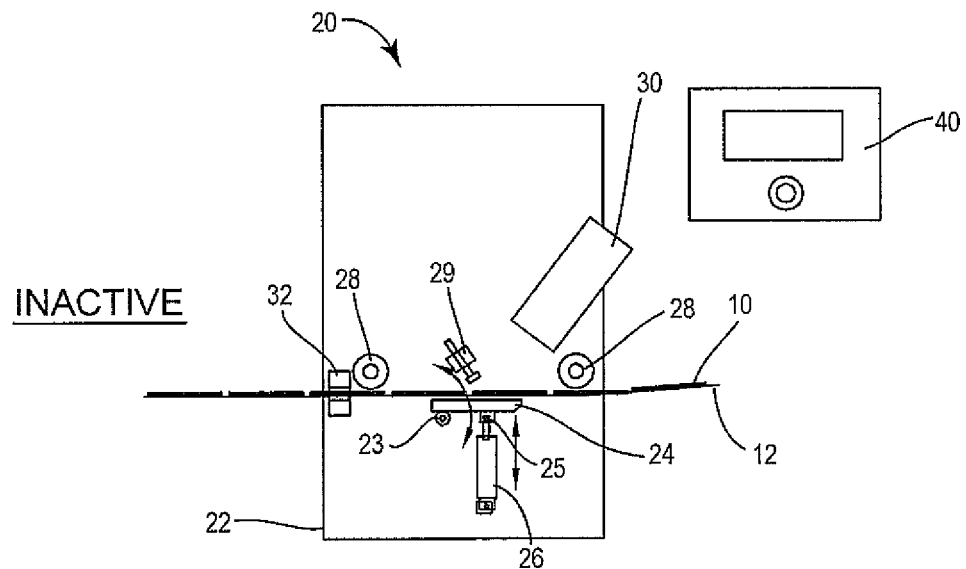
FIG. 6 is a side view of the label removal apparatus of FIG. 4 in an inactive state.
Figure 7:
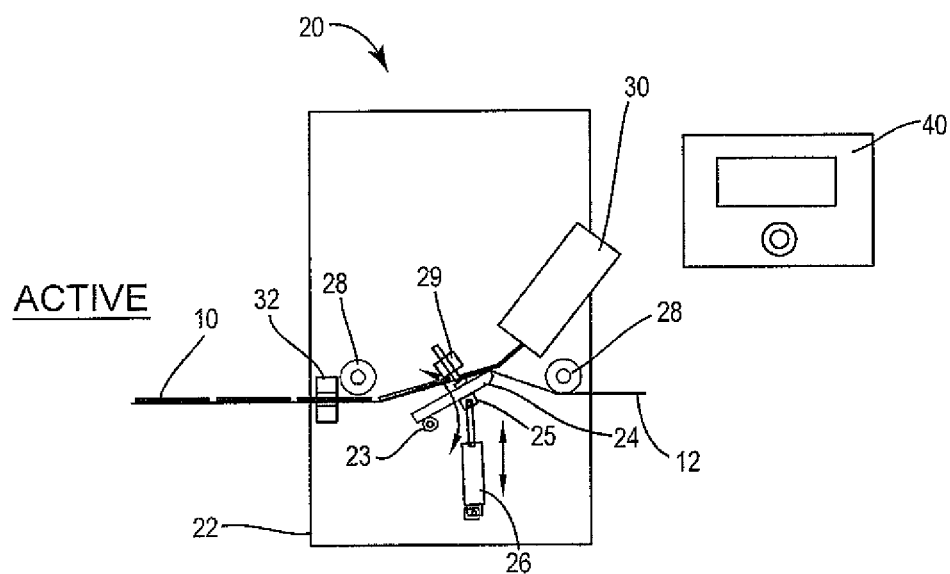
FIG. 7 is a side view of the label removal apparatus of FIG. 4 in an active state.

The plate 24 is mounted below the web 12 passing through the label removal apparatus 10. As shown in FIGS. 6-7, the plate 24 is coupled to the frame 22 at the leading edge with a pinned connection 23. The plate 24 is coupled to the actuator 26 at the trailing edge with a pivoting joint 25. The frame 22 is a stationary body that is coupled to a structure that is generally fixed vertically relative to the ground (e.g., the floor, a base, another mechanism, etc.). The actuator 26 is shown as a pair of pneumatic cylinders mounted on either side of the plate 24 with one end coupled to the plate 24 and the opposite end coupled to the frame 22. In other embodiments, the actuator 26 may include any number of linear or rotary actuators (e.g., hydraulic cylinders, motor driven devices, or any other devices). The actuator 26 moves the plate 24 between a first position (e.g., lowered position, horizontal position, home position, inactive position, etc.) and a second position (e.g., raised position, angled position, active position, etc.). The plate 24 may be limited by one or more mechanical stops 29. The positions of the stops 29 may be adjustable. In the first position, the plate 24 is lowered in a horizontal orientation such that the web 12 can pass over the plate 24 unencumbered through the label removal apparatus 10. In the second position, the actuator 24 moves the trailing edge of the plate 24 upward. The pinned connection 23 and the pivoting joint 25 allow the plate 24 to be angled relative to horizontal in the second position. In the second position, the plate 24 reroutes the web 12 and labels 10 to another angle. The web 12 engages one or more rollers 28, which are coupled to the frame 22, such that displacement of the web 12 by the plate 24 is localized and the web 12 enters and exits the label removal apparatus 10 at the same points whether the plate 24 is in the first position or the second position.

According to an exemplary embodiment, the removal device is a vacuum take away device 30 that uses a vacuum to pull the labels 10 off of the web 12. The vacuum take away device 30 is configured to selectively remove or peel off the labels 10 from the web 12. The angle of the web 12 proximate the vacuum take away device 30 (i.e., the peel angle) may be adjusted to facilitate the removal of the labels 10 from the web 12. For example, the vacuum take away device 30 may be able to more easily remove the labels 10 as the angle increases. The peel angle may be adjusted via the mechanical stops 29, to limit the angle.

The vacuum take away device 30 may be connected to an existing vacuum system in use with the mechanisms processing the labels 10 before or after the label removal apparatus 20. The labels 10 removed from the web 12 by the vacuum take away device 30 may be routed to a vacuum duct and automatically discarded in a receptacle for disposal.

The actuator 26 is controlled by a controller 40 that monitors the passage of the labels 10 and web 12 through the label removal apparatus 20 and determines how many labels 10 to remove from the web 12. In an exemplary embodiment, the control system 40 includes a processor 42, a memory device 44, a user input device 46, and an output device 48. According to an exemplary embodiment, components of the control system 40 may be housed in an industrial cabinet to protect the components from the elements.

The processor 42 can be implemented as a general purpose processor, an application specific integrated circuit (ASIC), one or more field programmable gate arrays (FPGAs), a group of processing components, or other suitable electronic processing components. In another exemplary embodiment, the control system 40 may include a controller lacking a processor or memory. For example, the control system may be a linear circuit.

The memory device 44 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 44 may be or include volatile memory or nonvolatile memory. The memory device 44 may include database components, object code components, script components, or any other type of information structure for supporting the various activities and information structures described in the present application. According to an exemplary embodiment, the memory device 44 is communicably connected to the processor via the processing circuit and includes computer code for executing (e.g., by processing circuit and/or processor) one or more processes described herein.

The input device 46 is one or more devices that allow a user to input commands and control variables for the label removal apparatus 20 (e.g., timing changes as required for different size labels 10, different desired leader lengths, etc.). The input device 46 may be, for example, a touch screen monitor, a keyboard or keypad, push buttons, dials, switches, or any combination of devices. The output device 48 is one or more devices that allow a user to monitor the properties of the label removal apparatus 20 and may be integrated with the input device 46. The output device 48 may be, for example, a monitor, a touch screen monitor, a text display, a numeric display, or a combination of devices.

The controller 40 monitors the passage of the labels 10 through the label removal apparatus 20 with the sensor device 32. The sensor device 32 detects the difference between the labels 10 and the web 12 (e.g., the gaps between the labels 10) to determine the rate with which the labels 10 and web 12 are passing through the label removal apparatus and the number of labels 10. The sensor device 32 transmits a signal to the controller 50. According to an exemplary embodiment, the sensor device 32 is a photoelectric eye. In other exemplary embodiments, the sensor device 32 may be any suitable device capable of detecting the labels 10 and/or the gaps between the labels 10 and transmitting a signal to the controller 50, such as a mechanical switch or a laser sensor.

As the labels 10 path beneath sensor device 32, the sensor device 32 transmits a signal or trigger to the controller 50. The controller 50 counts the number of triggers it receives. Once a predetermined count has been reached, the controller 50 activates the actuator 26 to raise the plate 24 from the first position to the second position. In the second position, the plate 24 locally deflects the web 12 at an angle (i.e., the peel angle) to bring it closer to the vacuum take away device 30, which peels or otherwise removes the labels 10 from the web 12.

The sensor device 32 continues to send signals to the controller 50 with the plate 24 in the second position. After the predetermined number of labels 10 have been removed from the web 12 by the vacuum take away device 30, the controller 50 activates the actuator 26 to lower the plate 24 to the first position. The cycle repeats until the operator stops the apparatus.

Figure 8:
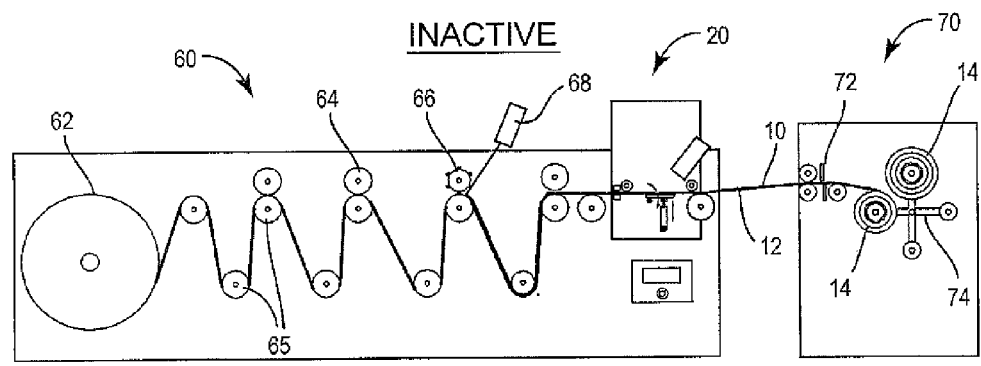
FIG. 8 is a side view of the label removal apparatus of FIG. 4 in an inactive state and installed in a label converting press, according to an exemplary embodiment.
Figure 9:
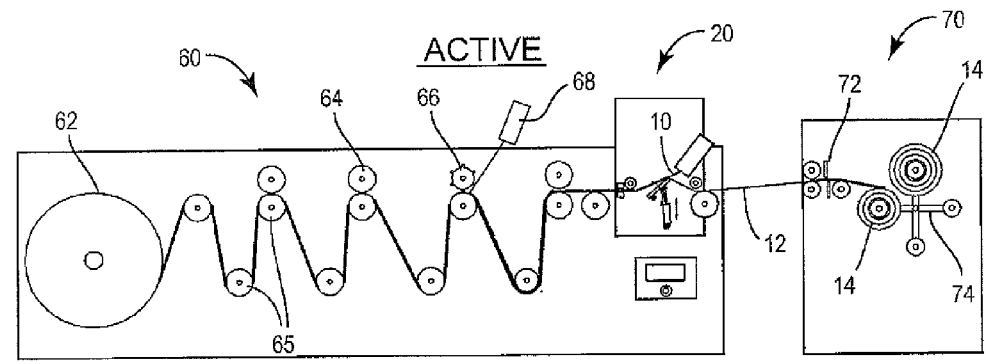
FIG. 9 is a side view of the label removal apparatus of FIG. 4 in an active state and installed in a label converting press, according to an exemplary embodiment.
Figure 10:
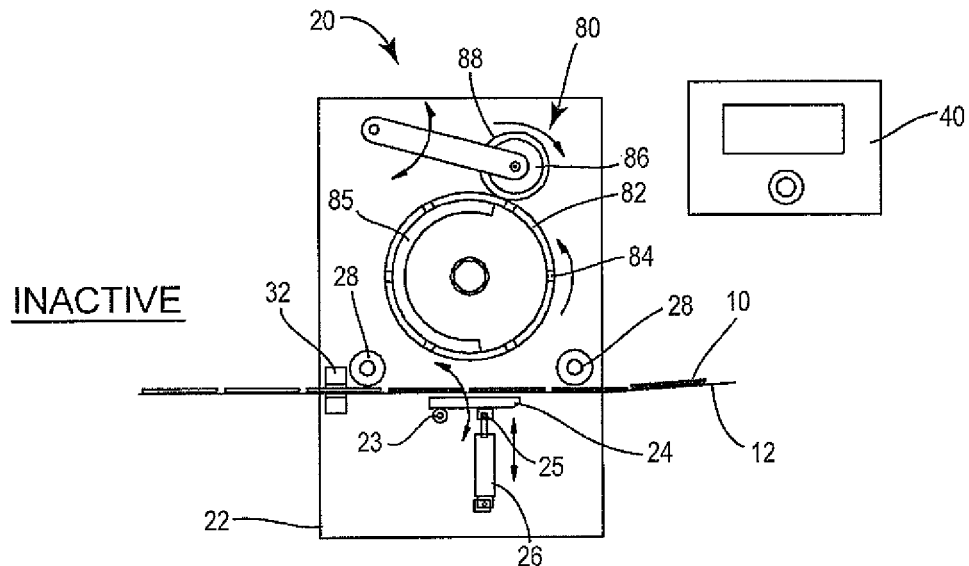
FIG. 10 is a side view of a label removal apparatus in an inactive state, according to another exemplary embodiment.
Figure 11:
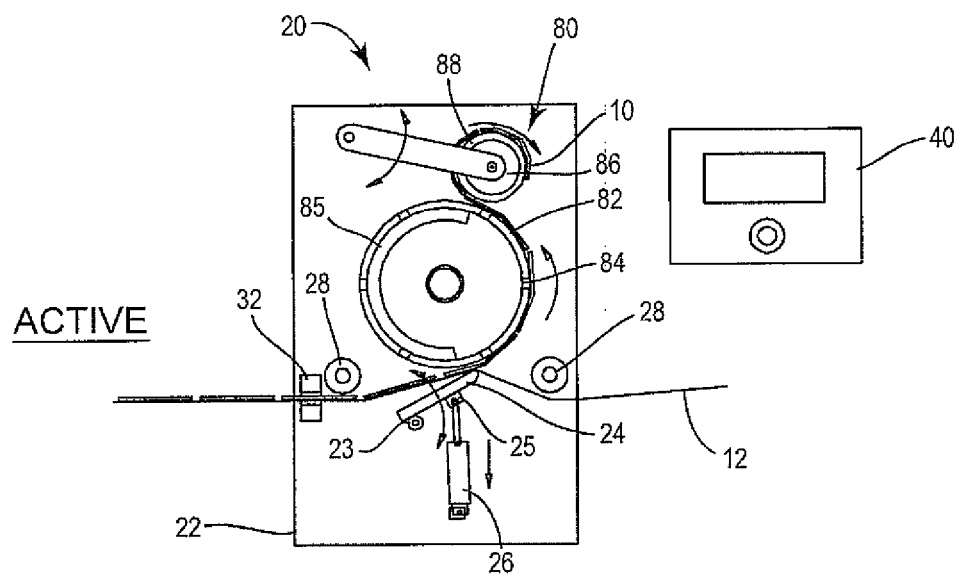
FIG. 11 is a side view of the label removal apparatus of FIG. 10 in an active state.
Figure 12:
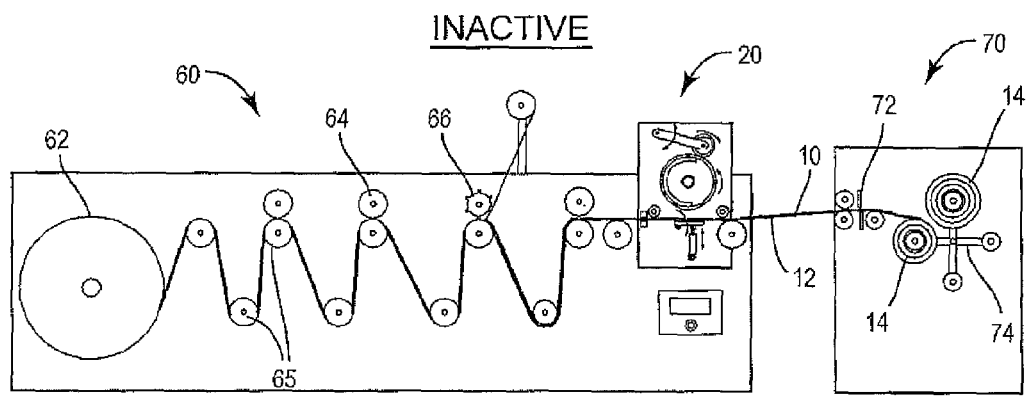
FIG. 12 is a side view of the label removal apparatus of FIG. 10 in an inactive state and installed in a label converting press, according to an exemplary embodiment.
Figure 13:
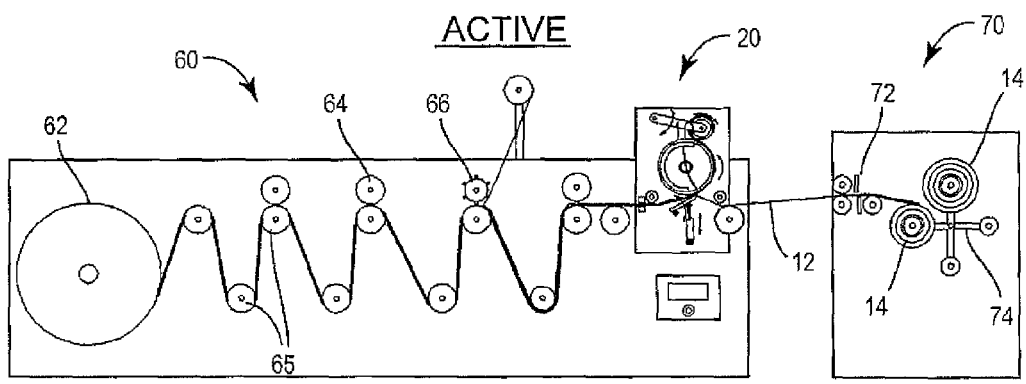
FIG. 13 is a side view of the label removal apparatus of FIG. 10 in an active state and installed in a label converting press, according to an exemplary embodiment.

Referring now to FIGS. 8-9, the label removal apparatus 20 is shown mounted in line with a label converting press 60 configured to print and cut a plurality of labels 10 on the web 12 and a turret rewinder 70 configured to wind the labels 10 and web 12 into the roll 14.

The label converting press 60, for example, may include a roll 62 of label media comprising a strip of label material and web. The label media is routed through multiple idle rollers 65. A print roller 64 prints the text and/or graphic designs on the labels 12 and a die cutter 66 cuts the label material into individual labels 10 while leaving the web 12 uncut. The label material removed to form the gaps between the labels 10 may be removed with a vacuum take away system 68.

The web 12 exit the label converting press 60. Instead of being routed directly to the turret rewinder 70, the web 12 is run through the label removal apparatus 20 where a desired number of labels 10 are removed from the web 12. After exiting the label removal apparatus 20, the web 12 is run through the turret rewinder 70.

The turret rewinder 70, for example, may include a web cutter 72 configured to cut the web 12 into discreet lengths with the portion of the web 12 lacking the predetermined number of labels 10 and forming the leader 18 on one end. The web 12 is wound onto a core mounted to a turret 74. Once the roll 14 is completely wound, the turret 74 is advanced so that a new roll 14 can be started and the finished roll 14 removed. The controller 50 controls the web cutter 72 and the turret 74 to produce a finished roll 14 with a desired number of labels 10 and a leader 18 of a desired length.

Referring now to FIGS. 10-13, a label removal apparatus 20 is shown according to another exemplary embodiment in which the removal device is a drum accumulator 80. Such a drum accumulator 80 includes a cylindrical drum 82 with an array of vacuum holes 84 disposed, about the circumference of the drum 82. A vacuum is drawn on the drum 82 and the labels 10 are held against the drum 82 at the vacuum holes 82. The drum 82 rotates to bring the labels 10 away from the web 12 until they reach an accumulation roller 86. According to an exemplary embodiment, the accumulator roller includes a discardable core 88 that is formed from a material to which the labels 10 will adhere (e.g., cardboard, etc.). The labels 10 are held on the drum 82 with the adhesive side facing outward. As the labels 10 reach the accumulation roller 86, the labels sticks to the core 88, overcoming the force of the vacuum and removing the labels 10 from the drum 82. The core 88 may periodically be removed as a number of labels 10 are collected and replaced with a fresh core 88.

A vacuum blocker plate 85 may be disposed on the interior of the vacuum drum 82 opposite of the side of the drum on which the labels 10 travel from the web 12 to the accumulation roller 86. The vacuum blocker plate 85 is curved to match the interior surface of the drum 82 and includes sealing elements (e.g., gaskets, etc.) to form a seal against the interior surface of the drum 82. The vacuum blocker plate 85 minimizes vacuum losses on the side of the drum 82 on which the vacuum holes 82 are not covered by the labels 10.

The drum accumulator 80 may be utilized for a label removal apparatus 20 installed in line with an apparatus lacking an existing vacuum disposal system. A vacuum need only by applied to the drum accumulator 80 with the labels 10 disposed manually through the removal of the core 88.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the label removal apparatus as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method of manufacturing a roll of adhesive labels comprising the steps of:
   providing a plurality of adhesive labels fixed to a backing sheet;
   removing a predetermined number of labels from the backing sheet to thereby form a leading edge of the sheet that only includes the backing sheet and no labels, the removing controlled by monitoring the position of the backing sheet so that the length of the leading edge can be determined.

2. The method of claim 1, wherein the removing step includes using a vacuum device that creates a low pressure region on the opposite side of the label from the backing sheet to thereby separate the label from the backing sheet.

3. The method of claim 1, further comprising the steps of:
providing a sheet of label material mounted on the backing sheet; and cutting the label material into individual labels.

4. The method of claim 3, wherein the portion of the label material not foil ling the individual labels is removed from the backing sheet in order to provide the plurality of labels fixed to the backing sheet.

5. The method of claim 1, wherein the removing step includes using a drum wherein the interior of the drum is at a partial vacuum and the drum includes opening to thereby create a suction force used to remove the labels from the backing sheet in order to form the leading edge of the sheet.

6. The method of claim 5, wherein the removing step includes an accumulator positioned to collect the removed labels from the drum.

7. The method of claim 6, wherein the drum rotates so that the adhesive side of the label contacts the accumulator and the label is thereby transferred sequentially from the backing sheet to the drum to the accumulator.

\* \* \* \* \*